United States Patent [19]
Byrn et al.

[11] Patent Number: 5,533,020
[45] Date of Patent: Jul. 2, 1996

[54] ATM CELL SCHEDULER

[75] Inventors: Jonathan W. Byrn; Gary S. Delp; Philip L. Leichty, all of Rochester, Minn.; Baiju V. Patel, Mt. Kisco, N.Y.; Kevin G. Plotz, Byron, Minn.; Frank A. Schaffa, Hartsdale; Marc H. Willebeek-LeMair, Millwood, both of N.Y.

[73] Assignee: International Business Machines Corporation, Armonk, N.Y.

[21] Appl. No.: 332,160

[22] Filed: Oct. 31, 1994

[51] Int. Cl.$^6$ ............................................. H04L 12/56
[52] U.S. Cl. ........................ 370/60.1; 370/85.7; 370/94.2
[58] Field of Search ............................... 370/60, 60.1, 61, 370/94.1, 94.2, 85.6, 85.7, 84, 79, 95.1; 340/825.5, 825.51; 395/650

[56] References Cited

U.S. PATENT DOCUMENTS

| | | | |
|---|---|---|---|
| 5,050,161 | 9/1991 | Golesfani | 370/85.6 |
| 5,150,358 | 9/1992 | Punj et al. | 370/85.6 |
| 5,231,633 | 7/1993 | Hluchyj et al. | 370/60 |
| 5,268,900 | 12/1993 | Hluchyj et al. | 370/85.6 |
| 5,422,888 | 6/1995 | Wienkop | 370/60 |

Primary Examiner—Wellington Chin
Assistant Examiner—Chau T. Nguyen
Attorney, Agent, or Firm—Douglas W. Cameron

[57] ABSTRACT

A method and apparatus for scheduling the transmission of a number of data streams over a common communications link, where each of the data streams conforms to a corresponding set of flow control parameters. Each of the data streams to be transmitted on the communications link is stored in a corresponding queue. The status of each queue is maintained, and a target transmission time is calculated for each queue. Signals are then generated for each queue at a time at least after the target transmission time, and these signals are used to indicate to a corresponding queue that is can transmit a cell on the link. Upon reception of a corresponding signal, a queue then transmits at least one cell onto the communications link.

7 Claims, 5 Drawing Sheets

5,533,020

ATM CELL SCHEDULER

TECHNICAL FIELD

This invention relates to a method and apparatus for scheduling the transmission of cells in a number of data streams over a common communications link.

DESCRIPTION OF THE PRIOR ART

In a packet based communication network which supports the simultaneous flow of multiple virtual connections (VC) through each physical communication link, packets or cells (cells are fixed size packets) belonging to different virtual connections will be interleaved as they are transmitted onto the communication link. Whether the origin of the packets or cells is at an end-station directly connected to a communication link or from a switch which is multiplexing multiple incoming links to the same outgoing link, the scheduling of packets or cells onto the outgoing link must be performed in such a way so as to satisfy the negotiated quality of service (QOS) of the virtual connections (VC's) to which they pertain. One example of the type of network described above is the Asynchronous Transfer Mode (ATM) ("Asynchronous Transfer Mode: Solution for Broadband ISDN", M de Prycker, Ellis Horwood, 1991) the internationally agreed upon technique for transmission, multiplexing, and switching in a broadband network. It uses fixed size cells as a unit of transmission.

ATM networks are designed to support the integration of high quality voice, video, and high speed data traffic. To the end-user, it promises to provide the ability to transport connection-oriented and connectionless traffic at constant or variable bit rates. It allows for allocation of bandwidth on demand and intends to provide negotiated Quality-of-Service (QOS). To a network provider, it enables the transport of different traffic types through the same network. In order for a network to meet QOS requirements as set by the user for a session, the network must have sufficient information about the traffic characteristics of the session. This may be approximated by (but not limited to) three basic parameters: 1) average transmission rate, 2) peak transmission rate and 3) the interval over which the data may be transmitted at peak rate. As a part of the QOS contract with network, all sessions must abide by the traffic parameters and not violate these parameters in order for the network to guarantee QOS to all the users. This gives rise to a complex scheduling problem when many sessions are established over a network link, which requires that each session's contract with the network not be violated. At the same time, all sessions must get the desired capacity from the network. This problem is fairly complex particularly when it involves a large number of sessions with a wide range of traffic descriptors. The problem is further compounded with the fact that different sessions require different QOS. Therefore, in case of contention, where a multiplicity of sessions have data to be transmitted and their individual contracts with the network will allow them to transmit, sessions requiring stricter QOS guarantee must be given priority over other sessions.

Traditional network scheduling algorithms e.g., Token Ring (Token Ring Access Method and Physical Layer Specifications, IEEE, 1985) and Ethernet (The Ethernet: A Local Area Network: Data Link Layer and Physical Layer Specifications, Version 2.0, Digital Equipment Corporation, Intel, Xerox, 1982) have a fairly simple notion of traffic. These network scheduling algorithms are based on best effort transmission schemes, whereby each user may be able to get a fair share of the network bandwidth. There is no pre-negotiated traffic descriptor or Quality-of-Service (QOS) requirements. Users try to get as much of a share of the bandwidth as possible, and network scheduling algorithms distribute the bandwidth fairly between them. The above scheduling algorithms are relatively simple and very well known. When the network provides a transmission opportunity (e.g., by means of a token in a Token Ring network) to a user, the user will transmit data based on a first-come first-serve policy.

The FDDI Standard (ANSI Standard, "FDDI SMT, ANSI X3T9.5) attempted to introduce the basic notion of negotiated bandwidth. Herein the user requests bandwidth by means of specifying only one rate (peak rate), requirement and the network controls when that user may be able to transmit. There is no notion of average rate or burst length. In all these examples of prior art, the local area networks regulate transmission opportunities based on a simple fairness algorithm.

Traditionally, in the wide area network, the user is offered a fixed rate connection as in the telephone network, including DS hierarchy, SONET and N-ISDN ("Networks and Telecommunications: Design and Operations" by M. P. Clarck, Willey, 1991) where the slots for transmission are available at every fixed time interval (determined a priori), and the user is able to transmit at that rate only. Therefore, once again, the scheduling is periodic. These kinds of networks are very poor at supporting different traffic types with variable inter-arrival rates, and require very simple schedulers. Since the links are partitioned into fixed data rate sessions, and each user is allocated a predetermined periodic time slot there is no notion of priorities amongst different users.

ATM networks promise to guarantee quality of service based on user specified traffic descriptors. The algorithm used to determine when a cell for a single session may be transmitted (Leaky Bucket) is specified in the ATM (ATM FORUM UNI 3.1) standards and studied in numerous research publications "Spacing Cells Protects and Enhances Utilization of ATM Network Links" by Boyer, et.al., IEEE Network Magazine September 1992 Vol. 6 No. 5). This leaky bucket algorithm may be used to determine if a cell is allowed to be transmitted for any single session at a given time. Therefore, one obvious implementation for scheduling multiplicity of sessions based on the known art is to run the leaky bucket algorithm at any time t for all the sessions to determine which sessions may be scheduled for transmission at that time. Then, cells from these sessions may be scheduled based on their assigned priorities. This approach has a scaling limitation in that it can only support a limited number of sessions. It is similar to the well known polling algorithms (Computer Networks by A. S. Tanenbaum, Prentice Hall International, 1988, pp. 110–111), where the scheduler must process each session (that includes computation, memory access etc.) during each cell transmission cycle. This can be intractable when the number of sessions is large. This problem is particularly critical in a server which supports many client connections.

Our invention is an event driven scheduler which processes a cell and corresponding queue only once for every cell transmitted. Any inactive queues have no processing required. The active queues are processed only once for each cell.

SUMMARY OF THE INVENTION

The basic motivation behind this design is to reduce the number of operations that need to be performed in a cell time (the time needed to transmit a cell) to a minimum, while maintaining an accurate scheduling of cells. This is achieved both through parallelism and pipelining. The multiple rate circular queues have several advantages: 1) Allow simple insertion of cells into queues based on priority, rate, and TTT. No searching through the queues is required since each queue slot can be indexed as a function of the cell TTT. 2) Enable the scheduling of cells with a wide range of transmission rates. 3) Reduce the number of queue entries that must be visited in each scheduling cycle (cell time).

Accordingly, this invention provides a method and apparatus for scheduling the transmission of a number of data streams over a common communications link where only one of the streams can use the link at any given time. The data streams must also conform to corresponding flow control parameters. With this invention, cells from the data streams are stored in corresponding queues where there is one queue corresponding to each data stream. The status of each queue is maintained where the status of each queue is at least the time when a cell was last transmitted from the queue and a credit count indicating the number of cells that may be transmitted from each queue in selected time intervals. Then, a target transmission time is evaluated for each queue, and signals are generated for each target transmission time at a time at least after each target transmission time is reached. Each signal is used to indicate that a corresponding queue can transmit a cell on link. Finally, upon reception of one of the signals a corresponding queue transmits cells stored in itself onto a communications link.

In a more specific embodiment of this invention the identification of various queues are stored in the entries of a timing wheel according to their relative target transmission times. As the timing wheel rotates specific queues are selected for transmission.

DESCRIPTION OF THE PREFERRED EMBODIMENT

Figure 1:
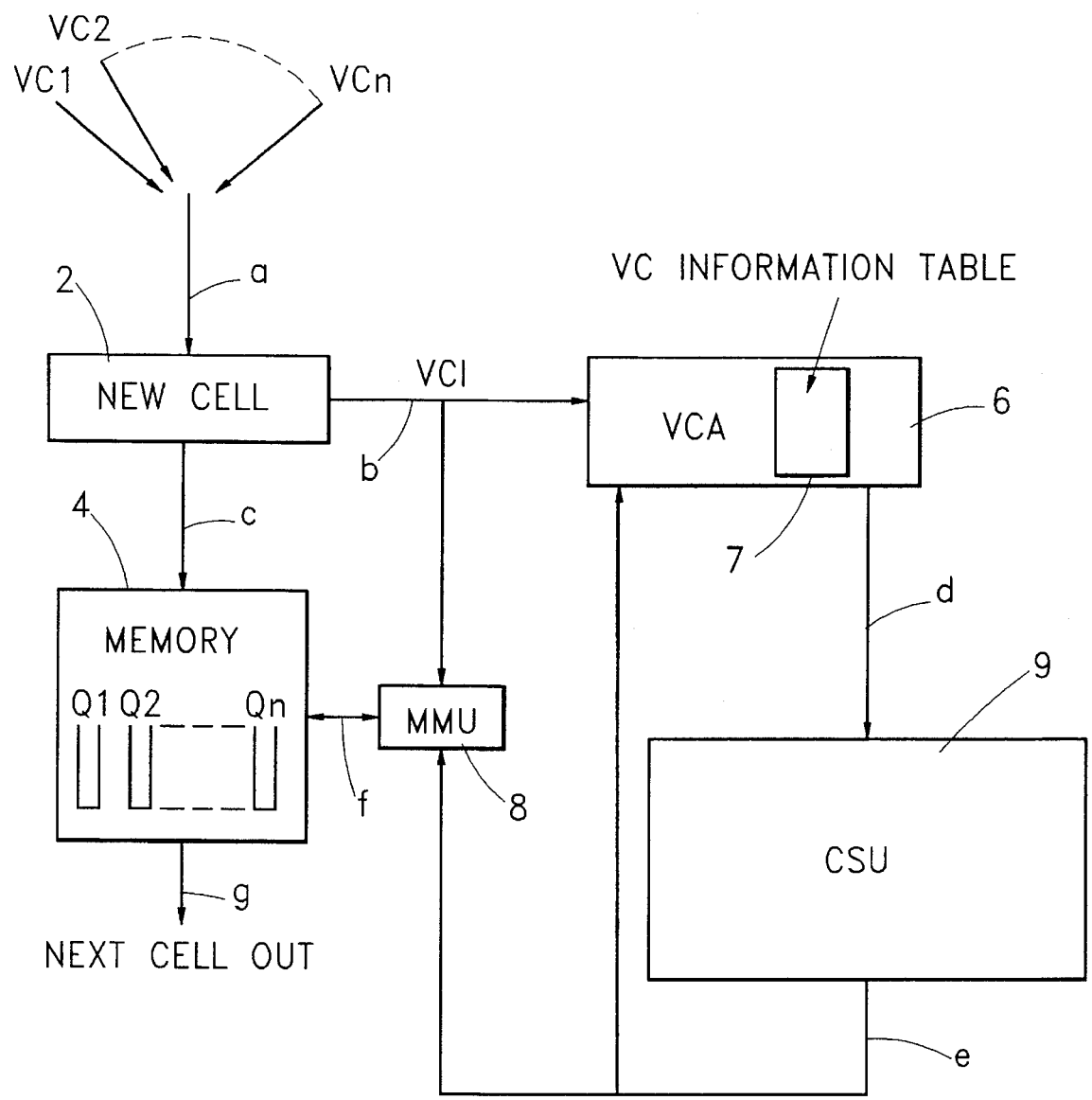
FIG. 1 is the schematic of the ATM Scheduler.
Figure 3:
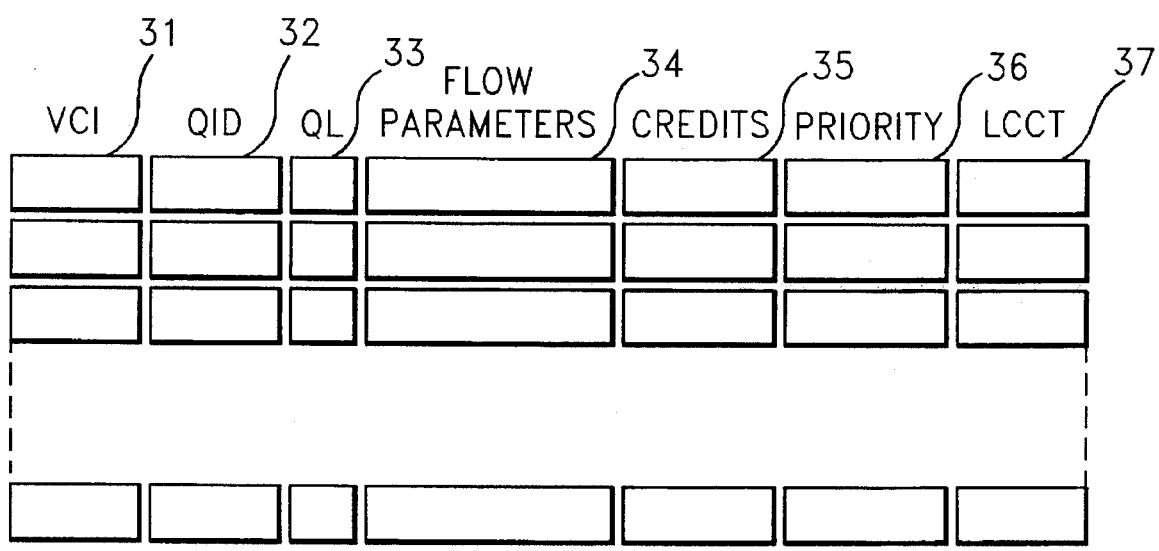
FIG. 3 shows the table use to store the virtual connection state.

The ATM scheduler of this invention is illustrated in FIG. 1. Each virtual connection (VCI) is assigned a unique queue ID (QID), which corresponds to one of a multiple of queues (Q1, Q2, . . . , Qn) in memory 4. Associated with each QID is the negotiated quality of service (QOS) flow control parameters for the VCI. When a new cell arrives (path a) (in 2 of FIG. 1) the Virtual Connection Identifier (VCI), identifying a virtual connection VCI, is passed (path b) to the Memory Management Unit (MMU) 8, and the Virtual Connection Activator (VCA) 6 described below. The MMU places the cell in memory 4 and updates the corresponding Virtual Connection queue pointers in the MMU (control on path f and data on path c) for locating the corresponding Qi of a given VCI. The VCA checks to see if the queue corresponding to a VC is active or inactive by checking the queue length (QL), which is the number of cells in the queue, in the VC Information table 7. If QL>0 the VC is already active (meaning a cell is currently scheduled for transmission), QL for the corresponding queue is incremented. If a queue for a VCI has to be activated, then QL is incremented, and a Target Transmission Time (TTT) (see below) is calculated for the incoming cell. TTTs are determined using some variation of the leaky bucket algorithm, which insures that the negotiated QOS and peak rate are enforced. For explanation of term: "maximum credit", for example, let a VC be characterized by a mean rate (RM), a peak rate (RP), and a maximum credit (Mc). The mean rate is specified in terms of the mean time between the transmission of consecutive cells. The peak rate is specified in terms of the minimum time allowed between the transmission of consecutive cells. At any given time, Credit (c) is a measure of the number of consecutive cells that may be transmitted on a VC at its peak rate, RP. The maximum value of c (MC) is stored in the VC information table 7 at 34. The TTT is calculated based on the flow control parameters and the Last Cell Transmission Time (LCTT) for a virtual connection listed in the VC Information table (FIG. 3). All the fields of the table are described herein. The Current Transmission Time (CTT) is the current value of the transmission reference clock. This could, for example, be done as follows:

1. If CTT−LCTT≧RM, the cell is scheduled now, that is (TTT=CTT), where CTT is the current time;

2. If c≧1 and CTT−LCTT≧RP CTT−LCTT<RM, the cell is scheduled now,

3. If c≧1 and CTT−LCTT<RP CTT−LCTT<RM the cell is scheduled at the peak rate, (TTT=LCTT+RP), 4. If c<1 and CTT−LCTT<RP CTT−LCTT<RM the cell is scheduled at the mean rate, (TTT=LCTT+RM).

Figure 4:
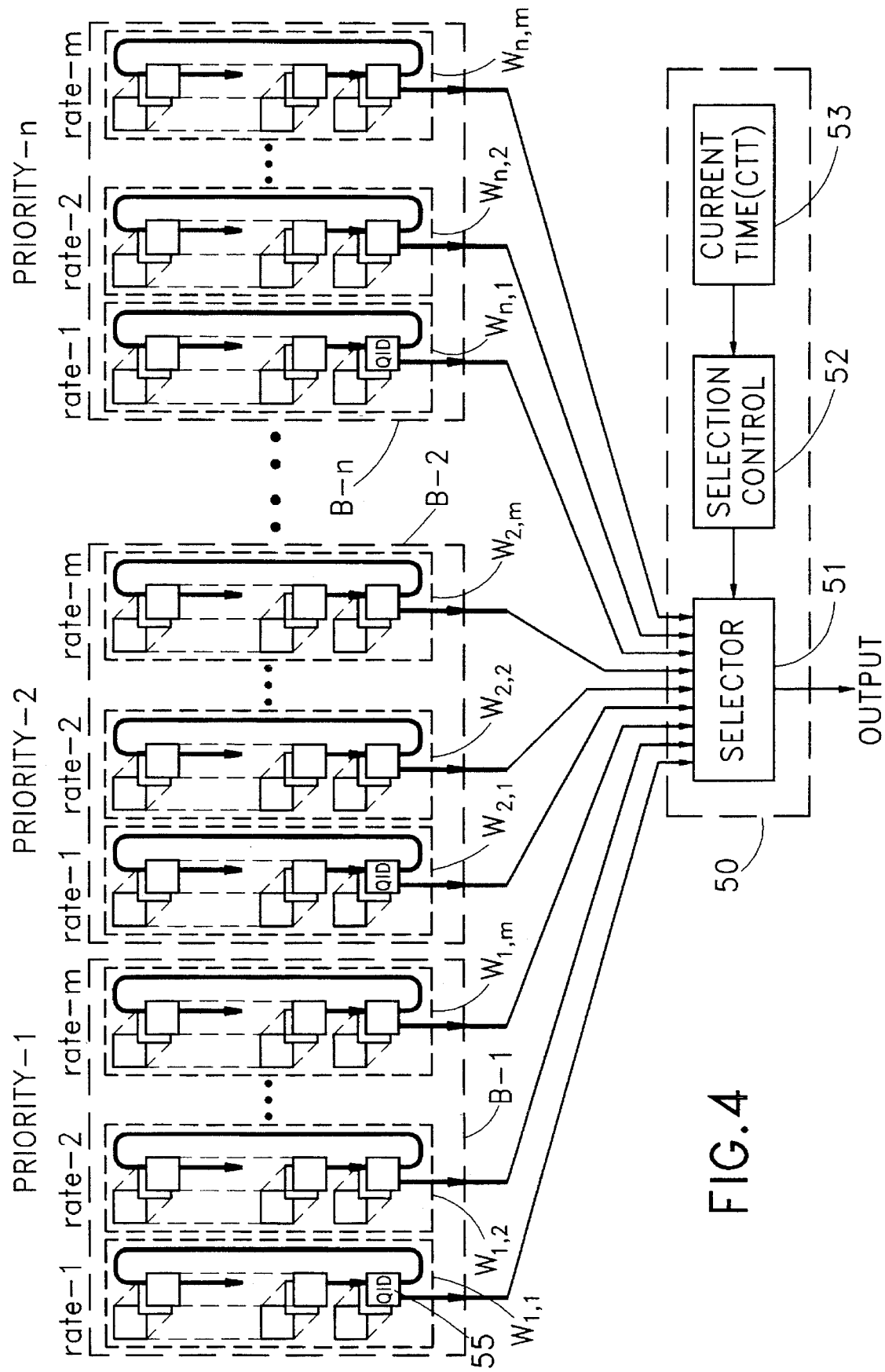
FIG. 4 illustrate the details of timing wheels and the output multiplexer.

In the Cell Scheduling Unit (CSU) 9, a cell is scheduled for transmission at a future time. To explain how this is done we will first describe the CSU. A detailed block diagram of the CSU is illustrated in FIG. 4. The CSU comprises n banks of circular queues, B-1 through B-n in FIG. 4, where n is the number of priorities supported. Within each bank there are up to m circular queues Wp,r (Timing Wheels), each wheel corresponding to a priority p and wheel rate r. The different wheel rates are used to support different VC transmission requirements. For example, wheel rate 1 may shift at a rate of one slot per cell time (r1=1), wheel rate 2 may shift at one slot per 10 cell times (r2=0.1), rate 3 may shift at one slot per 100 cell times (r3=0.01), and so on. If the common communications link bandwidth is B cells per second, and each ring contains 100 slots or entries, then timing wheel at rate 1 will support virtual connection (VC) rates from B to B/100 cells per second, and timing wheel at rate 2 will support VC rates from B/10 to B/1000 cells per second, and timing wheel at rate 3 will support VC rates from B/100 to B/10000 cells per second, and so on.

A priority value (p) is assigned to each cell based on the negotiated QOS parameters for a virtual connection. A wheel rate (r) is assigned to each cell based on its TTT by VCA. The appropriate wheel rate (r) is chosen as the smallest value of ri such that 1/ri≦TTT−CTT<1/ri+1 The QID, TTT, priority (p), and wheel rate (r) are passed to the CSU through path d.

The placement of the QID (identifying one of Q1 through Qn) for a cell into the timing wheels is straightforward. The associated priority (p) and timing wheel rate (r) are used to select the appropriate timing wheel Wp,r where r varies between 1 and m in FIG. 4 and p varies between 1 and n in FIG. 4. The associated TTT is used to insert the cell QID into a specific slot in the ring, at displacement (TTT−CTT)/r from the current position where CTT is the current transmission time. If cells for multiple QIDs happen to have the same TTT, multiple cells may be queued into the same wheel slot through a linked list.

Initially, the current position of a timing wheel corresponds to the current transmission time (CTT). This current position is updated based on the following: 1) if there are scheduled queues at the current position, the current position is advanced only after all the QIDs at the current position have been serviced. 2) if the current position has no QIDs to be serviced, the current position is advanced until either a position corresponding to the CTT is reached, or a non-empty position is reached.

The wheels are implemented by a block of locations in a memory. The data in the wheel does actually move, but the wheels rotate by the means of incrementing a counter pointing to the a position in the wheel.

The queues in memory 4 pointed by the current position of wheels are serviced in order of wheel priority and wheel rate. For example, in FIG. 4, W1,1 is serviced before W1,2 and Wn,m is serviced last. Output multiplexer 50 examines each wheel Wp,r before selecting a queue QID on output for transmission.

The CTT is incremented after a cell is transmitted, or the time to transmit a single cell at the link speed is elapsed. All cells in a higher priority wheel with a TTT<=CTT are serviced before the next priority queue is examined. This can result in some jitter, but this will not accumulate if the VC allocation has been performed properly.

Figure 5:
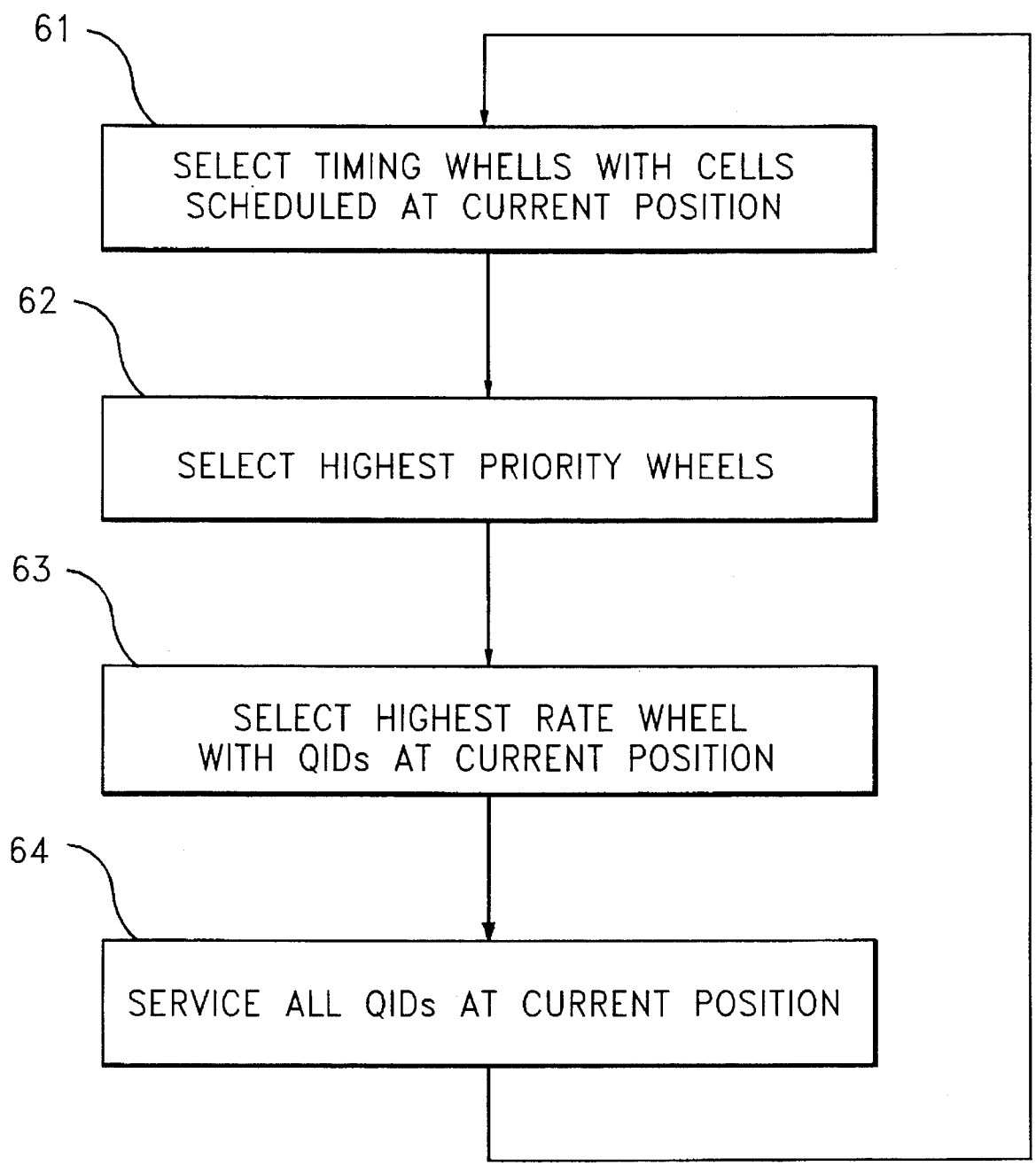
FIG. 5 illustrate the operation of out multiplexer.

The selector 51, in FIG. 4 is used to select one of the timing wheels. The selection control 52 identifies a wheel for transmission of a cell at current time 53 by first selecting all the timing wheels 61 in FIG. 5 that have cells scheduled for transmission at current time. Among them, the highest priority wheel is selected first 62. If multiple wheels with the same priority are eligible with above criteria, the wheels with highest wheel rate is selected first 63. Once a wheel is selected, all the QIDs at the current position of the wheel are serviced (e.g., in first-come-first served order) 64. A bound can be placed on the number of consecutive cells transmitted from a single priority queue to prevent starvation of lower priority queues. This process is repeated.

Once a wheel is selected, a QID at the current wheel position is passed to the Memory Management Unit (MMU) (path e) which pulls the cell from the head of the queue (Qi) out of memory, and updates the queue state. The cell is sent out for transmission (path g) and onto a communication link. The QID is also passed to the VCA (path e) in order for the next cell for that VCI to be scheduled as discussed earlier. The VCA will decrement the appropriate VC queue length (QL), update the VC Information table (FIG. 3), and initiate a new cell schedule if the length is greater than zero. For example, update the credit count:

1. c=c−1+(CTT−LCTT)/RM, where CTT is the current transmission time,
2. LCTT=CTT.

The QID is removed from the current wheel position after a cell transmission from the queue pointed by that QID, and the process is repeated until all cells scheduled at the current wheel position are transmitted.

The different fields of the table shown in FIG. 3 are as follows. The VCI, 31, stores ATM virtual path (12-bit) and virtual connection (16-bit) identifiers as described in ATM Forum UNI 3.1 document published by the ATM Forum. The QID field, 32, is 16-bit allowing up to 64K queues. The QL, 33, field is 16-bit, allowing up to 64K cells in each queue. Therefore, each queue may be holding in excess of 3 Mbytes of data for each connection. The flow parameters, 34, include peak (RP) and average rate (RM), represented using 16-bit, and maximum credit field is 10-bit. This allows the rates between 8 Kbps (compressed voice) to SONET OC3 rates of 155 Mbps in the 64K steps and the maximum burst length up to 1023 (10 bit). The credit field, 35, is 10-bit. The priority field, 36, is 4-bit allowing 16 different priority levels and LCTT, 37, (last cell transmission time) is 32-bit value and is counted in cell transmission time as a units. For ATM data rates of 155 Mbps, the unit of time for last cell transmission time will be approximately 2.6 microseconds which is also the time unit used for TTT and CTT.

Figure 2A:
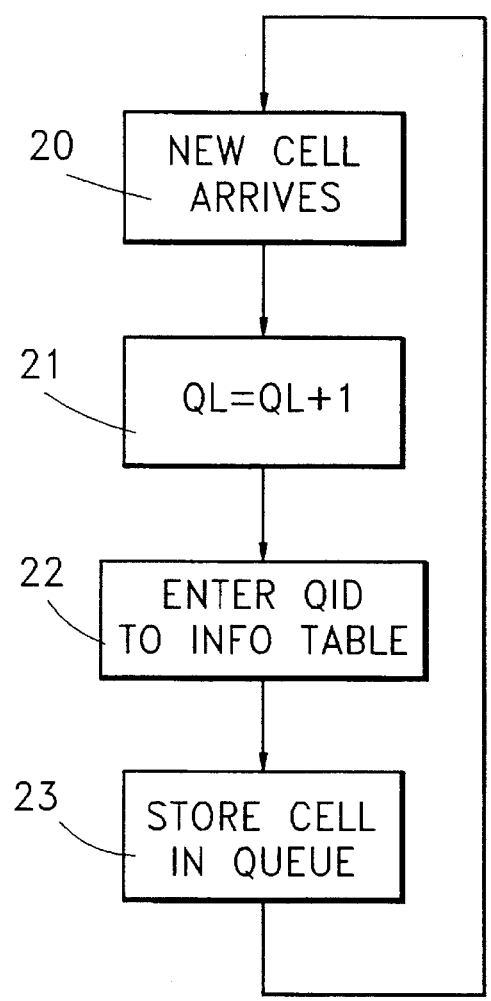
FIGS. 2A and 2B are the flow chart of the operations of the ATM Scheduler.

Shown in FIG. 2 is the flow diagram for the overall operation of the asynchronous transfer mode (ATM) scheduler. FIG. 2A describes the arrival a cell and its storage in the memory. Upon arrival (FIG. 2A) of a cell at the scheduler (Box 20), it is stored in one of the queues of memory 4 (Box 23), and the queue length (QL) in the virtual connection information table 7 is incremented by 1 (Box 21). At the same time the virtual circuit connection ID of the cell is passed to the virtual connection activator 6 of FIG. 1 (Box22).

Figure 2B:
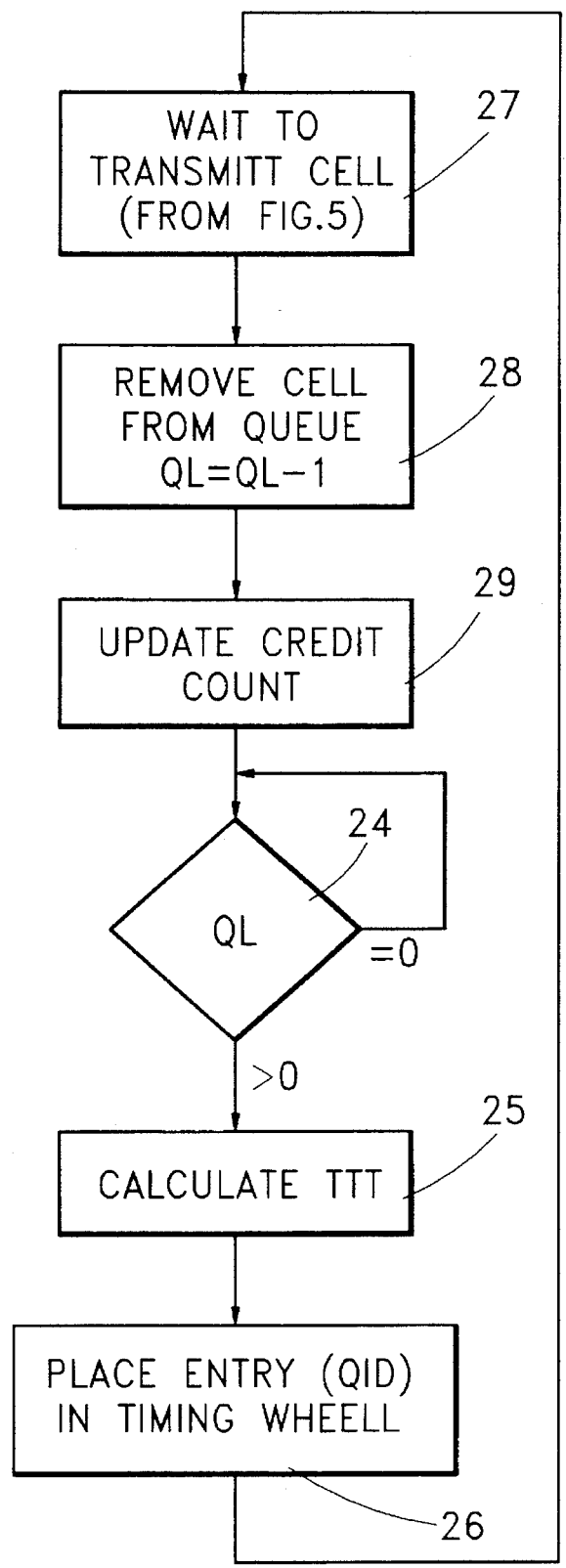

FIG. 2B describes the scheduling of transmission of the cell from the queues of memory 4 onto a common communication link g. The scheduling processes are implemented by the VCA. A virtual connection identifier (VCI) is used to index the virtual connection information table 7 to determine whether or not the connection is active (Box 24), which means that there is a cell scheduled for transmission for the virtual connection. If there are cells to be transmitted, then the queue length (QL) is greater than 0; otherwise, the virtual connection is said to be inactive or QL=0. If the virtual connection is inactive, then no further action is necessary (Box 24). If the virtual connection is active (QL>0), then a target transmission time is evaluated for the next cell of the virtual connection (Box 25). This target transmission time is then used to place an entry in a timing wheel (Box 26), where the position of this entry on the timing wheel corresponds to the target transmission time. That is, consider for example, the numbers on the face of a clock and the position on the face of the clock where the entry should be stored. For example, if target transmission time 2 were greater than target transmission time 1, then the entry corresponding to target transmission time 2 would have to be in a position that is in a clockwise direction from the entry for target transmission time 1. For example, if target transmission time 2 is at the 4 o'clock position, then target transmission time 1 could be at 3 o'clock, but it could not be in any position clockwise from 4 o'clock (Box 26). The position of each entry thus corresponds to an absolute time on the timing wheel which rotates at a speed corresponding to multiple of a cell transmission time. The cell transmission time is the time to transmit a cell at the link transmission rate. When the current transmission time matches the time corresponding to a cell entry, the cell is due for transmission (Box 27). The entry, which is the VCI of the cell, is used to select which queue of queues, $Q_1$ through $Q_N$ is to be serviced. At the same time, the cell is removed from the queue, and QL is decremented (Box 28), and the credit count, referred to above, is updated in the virtual circuit information table 7 (Box 29). This process then repeats itself by again checking if the queue length (QL) is greater than 0. The rotation of the timing wheel could be compared to the face of a clock rotating with time instead of the hands. When, for example, the 3 on the face of the clock rotates to a certain point, the queue indicated in the entry at the 3 o'clock position would be scheduled to transmit a cell.

The ATM scheduler is implemented using CMOS technology on a single VLSI chip and supports data rates up to 155 Mbps. The components 6, 8, and 9 are implemented on the chip while the CMOS DRAM external to the chip is used to implement memory 4. The components 6, 8, and 9 are described using VHDL specification language and are synthesized into VLSI design using industry standard synthesis tools.

Having thus described our invention, what we claim as new and desire to secure by Letters Patents is:

1. A method of scheduling the transmission of a plurality of virtual connections over a common communications link, where only one of said virtual connections can transmit on said link at any given time, where each of said virtual connections must conform to corresponding flow control parameters which control the number of cells that can be transmitted, said method comprising:

a. storing cells from each of said virtual connections in a corresponding queue, where there is one queue corresponding to each of said virtual connections b. maintaining the status of each of said queues in a memory, said status being at least a time when a cell was last transmitted from said each queue and a credit count indicating a number of cells that may be transmitted from said each queue in selected time interval;

c. evaluating a target transmission time for said each queue having cells to transmit on said link, each said target transmission time being dependent on said status of said each queue;

d. generating a signal for each corresponding said target transmission time at least after each said target transmission time is reached, where each said signal indicates that a corresponding queue should transmit a cell on said link; and e. transmitting at least one cell from a corresponding queue upon reception of said signal for said corresponding queue by said corresponding queue.

2. A method of scheduling the transmission of a plurality of virtual connections over a common communications link, where only one of said virtual connections can transmit on said link at any given time, where each of said virtual connections must conform to corresponding flow control parameters which control the number of cells that can be transmitted, said method comprising:

a. storing cells from each of said virtual connections in a corresponding queue, where there is one queue corresponding to each virtual connection b. maintaining the status of each of said queues in a memory, said status being at least a time when a cell was last transmitted from said each queue and a credit count indicating a number of cells that may be transmitted from said each queue in a selected time interval;

c. evaluating a target transmission time for said each queue having cells to transmit on said link, each said target transmission time being dependent on said status of said each queue;

d. generating signals, each signal indicating that a corresponding one of said queues should transmit a cell on said link, each of said signals being generated at a time which is based upon a corresponding said target transmission time, where a first of said signals must be generated before a second of said signals if said target transmission time for said first signal is before said target transmission time for said second signal; and e. transmitting at least one cell from a corresponding queue upon reception of one of said signals by said corresponding queue.

3. An apparatus for scheduling the transmission of a plurality of virtual connections over a common communications link, where only one of said virtual connections can transmit on said link at any given time, where each of said virtual connections must conform to corresponding flow control parameters which control the number of cells that can be transmitted, said apparatus comprising:

a. a memory means for storing cells from each of said virtual connections in a corresponding queue, where there is one queue corresponding to each of said virtual connection b. a first device for maintaining the status of each of said queues in a memory, said status being at least a time when a cell was last transmitted from said each queue and a credit count indicating a number of cells that may be transmitted from said each queue in selected time interval;

c. a second device for evaluating a target transmission time for said each queue having cells to transmit on said link, each said target transmission time being dependent on said status of said each queue;

d. a third device for generating a signal for each corresponding said target transmission time at least after each said target transmission time is reached, where each said signal indicates that a corresponding queue should transmit a cell on said link; and e. a fourth device for transmitting at least one cell from a corresponding queue upon reception of said signal for said corresponding queue by said corresponding queue.

4. A switching node for transmitting a plurality of virtual connections over a common communications link, where only one of said virtual connections can transmit on said link at any given time, where each of said virtual connections must conform to corresponding flow control parameters which control the number of cells that can be transmitted, said switching node comprising:

a. a memory for storing cells from each of said virtual connections in a corresponding queue, where there is one queue corresponding to each virtual connection b. a first device for maintaining the status of each of said queues in a memory, said status being at least a time when a cell was last transmitted from said each queue and a credit count indicating a number of cells that may be transmitted from said each queue in selected time interval;

c. a second device for evaluating a target transmission time for said each queue having cells to transmit on said link, each said target transmission time being dependent on said status of said each queue;

d. a third device for generating signals, each signal indicating that a corresponding one of said queues should transmit a cell on said link, each of said signals being generated at a time which is based upon a corresponding said target transmission time, where a first of said signals must be generated for a second of said signals if said target transmission time for said first signal is before said target transmission time for said second signal; and e. a fourth device for transmitting at least one cell from a corresponding queue upon reception of one of said signals by said corresponding queue.

5. A method of scheduling the transmission of a plurality of virtual connections over a common communications link, where only one of said virtual connections can transmit on said link at any given time, where each of said virtual connections must conform to corresponding flow control parameters which control the number of cells that can be transmitted, said method comprising:

a. storing cells from each of said virtual connections in a corresponding queue, where there is one queue corresponding to each virtual connection b. maintaining the status of each of said queues in a memory, said status being at least a time when a cell was last transmitted from said each queue and a credit count indicating a number of cells that may be transmitted from said each queue in selected time interval;

c. evaluating a target transmission time for each queue having cells to transmit on said link, each said target transmission time being dependent on said status of said each queue, wherein a plurality of target transmission times are generated;

d. storing an entry of in a predetermined position of a timing wheel, said position being determined by said target transmission time, said entry identifying one of said queues, said time wheel indicating when said target transmission times of said queues are reached e. generating signals, each signal indicating that a corresponding one of said queues should transmit a cell on said link, each of said signals being generated at a time which is based upon a corresponding one of said target transmission times, where a first of said signals must be generated for a second of said signals if said target transmission time for said first signal is before said target transmission time for said second signal; and f. transmitting at least one cell from a corresponding queue upon reception of one of said signals by said corresponding queue.

6. A method as recited in claim 5, wherein said timing wheel comprises:

a. a circular array of references to said queues so that said cells are scheduled for transmission and where each position in the array represents the time of transmission corresponding to one of said target transmission times for said queues; and b. a pointer for pointing to a position of said array, said pointer being periodically updated in accordance with a data rate supported by said circular array.

7. A method as recited in claim 5, wherein said entry are stored in a plurality of timing wheels which each of said timing wheels corresponding to a priority class at a specified data rate.

* * * * *